United States Patent
Robers

(10) Patent No.: US 6,667,950 B2
(45) Date of Patent: Dec. 23, 2003

(54) NON-PCM CODED INFORMATION ON A CD AUDIO DISC

(75) Inventor: Klaas Herman Jan Robers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 266 days.

(21) Appl. No.: 09/864,126

(22) Filed: May 24, 2001

(65) Prior Publication Data

US 2002/0009044 A1 Jan. 24, 2002

(30) Foreign Application Priority Data

May 30, 2000 (EP) .............................. 00201912

(51) Int. Cl.[7] .............................. G11B 7/24; G10L 27/00
(52) U.S. Cl. ..................................... 369/275.3; 704/500
(58) Field of Search .......................... 369/275.3, 30.09, 369/30.18, 30.21, 30.22; 375/240, 240.1, 240.11, 241, 242, 254; 704/500, 503; 360/40

(56) References Cited

U.S. PATENT DOCUMENTS

| | | | | | |
|---|---|---|---|---|---|
| 5,893,066 A | * | 4/1999 | Hong | ........................ | 704/500 |
| 5,974,380 A | * | 10/1999 | Smyth et al. | ................ | 704/229 |
| 5,987,417 A | * | 11/1999 | Heo et al. | .................... | 704/500 |
| 6,108,633 A | * | 8/2000 | Kolluru | ....................... | 704/500 |
| 6,119,092 A | * | 9/2000 | Patwardhan et al. | ........ | 704/503 |
| 6,205,223 B1 | * | 3/2001 | Rao et al. | ..................... | 380/42 |
| 6,226,325 B1 | * | 5/2001 | Nakamura | .................. | 375/240 |
| 6,226,616 B1 | * | 5/2001 | You et al. | ................... | 704/500 |
| 6,430,533 B1 | * | 8/2002 | Kolluru et al. | ............. | 704/500 |

OTHER PUBLICATIONS

Mike Smyth "An Overview Of The Coherent Acoustics Coding System", Jun. 1999.*

* cited by examiner

*Primary Examiner*—Tan Dinh
(74) *Attorney, Agent, or Firm*—Michael E. Belk

(57) ABSTRACT

A compact disc playable on an audio CD player has been provided with non-PCM encoded information. The non-PCM information is arranged in blocks of one or more most significant bits (MSBs). At least one MSB of each block is used for PCM encoding of a low-frequency signal, preferably in the frequency band below 2 kHz. The at least one MSB is used for encoding sound that has been written onto the compact disc as non-PCM encoded information.

9 Claims, No Drawings

NON-PCM CODED INFORMATION ON A CD AUDIO DISC

The invention relates to a compact disc playable on an audio CD player, which compact disc has been provided with non-PCM encoded information.

Such Compact discs are described, inter alia, on the website http://www.dtsonline.com/. On said site it is described that Compact discs can be provided with information encoded in a predetermined manner so as to enable surround sound to be stored in a digital manner on a Compact disc and to be reproduced via a suitable decoder system.

Also known are Compact discs on which, in addition to sound information, video information and/or other multimedia information is stored and which can be played on an audio CD player.

For a superficial observer and user such a Compact disc does not differ, on the face of it, from the existing Compact disc with audio information recorded with the aid of pulse code modulation (PCM). Such Compact discs with PCM encoded sound information can be played back on normal audio CD players, upon which the sound stored on the relevant Compact disc reproduced. The Compact disc referred to on the above-mentioned website should also be played back on an audio CD player. A special decoder connected to the digital output receives a digital signal via this digital output, which signal is decoded by the decoder so as to obtain multi-channel surround sound. However, such a Compact disc gives rise to a white-noise signal when the analog output is connected to a standard sound system while the special decoder is not used. Said white noise is also produced in the case of the aforementioned compact discs which also carry video and/or other multimedia information.

White noise is dangerous for treble loudspeakers (tweeters). These loudspeakers usually reproduce the frequency range from 5 kHz to 20 kHz. In music the power in this frequency range is small. It is customary that the tweeter can handle 10 percent to 20 percent of the total power that may be applied to a loudspeaker enclosure which accommodates the relevant tweeter. In white noise the power over a given bandwidth is substantially constant independently of the frequency. When a compact disc is played and the output signal supplied to the loudspeakers by the relevant audio CD player in fact consists of white noise only, only one quarter of the power (range from zero to 5 kHz) is applied to the bass and mid-range loudspeaker and three quarters (5 kHz to 20 kHz) of the power to the tweeter. Then, the risk is high that the tweeter is overloaded and breaks down. This problem occurs not only with CDs provided with surround sound in encoded form but also with special audio test CDs on which, inter alia, white noise has been recorded.

In practice, the tweeter is not protected by recording white noise on the compact disc with a lower volume. White noise does not sound loud to the human ear and, as a result of this, a user of an audio CD player will not be aware that the power in the white noise, which he does not perceive as loud, contains frequencies above 5 kHz, which are extremely harmful to the tweeter in his loudspeaker system. The human ear is most sensitive between 1 and 2 kHz and in this range white noise contains only a fraction of the power. Therefore, the user will not realize that it is risky to turn up the volume for the white noise.

In order to preclude indemnity claims compact discs of this type must be provided with a clear notice to warn that the relevant compact disc should not be played on a standard audio CD player system. This is a very customer-unfriendly measure.

It is known that CD ROMs contain information (data) which, when they are played on an audio CD player, sounds as white noise. However, such CD ROMs contain information which causes the player unit by which the CD ROM is played to mute a sound channel during playing. This measure cannot be applied to the present compact disc in view of the desired playability on an audio CD player.

It is an object of the invention to provide a compact disc provided with non-PCM encoded information that can be played safely on an audio CD player.

To this end, a compact disc in accordance with the invention is characterized in that the non-PCM encoded information is arranged in blocks of one or more most significant bits (MSBs), and at least one MSB of each block is used for encoding a low-frequency audio signal.

Thus, it is achieved that when a compact disc in accordance with the invention is played on an audio CD player and audio signal becomes audible whose frequency lies in or near the spectrum to which the human ear is most sensitive and which will be reproduced by the bass and/or mid-range loudspeakers. As a result of this, the user will reduce the power applied to the loudspeaker system when the relevant low-frequency audio signal is too loud, which also reduces the amount of white noise applied to the loudspeaker system to a level which is not harmful to the tweeters.

A preferred embodiment of a compact disc in accordance with the invention is characterized in that the low-frequency audio signal lies in the frequency range below 2 kHz.

The frequency range below 2 kHz belongs to the spectrum to which the human ear is most sensitive. Thus, it is achieved that even in the case of a comparatively small intensity of the low-frequency audio signal as recorded on the compact disc the user will limit the power applied to the loudspeaker system to a high-frequency power which is still "safe" for the tweeters.

A preferred embodiment of a compact disc in accordance with the invention is characterized in that the low-frequency audio signal is a single tone of approximately 1 kHz.

Another preferred embodiment of a compact disc in accordance with the invention is characterized in that the at least one MSB is used for PCM encoding of the sound recorded on the compact disc as non-PCM encoded information.

Thus, it is achieved that the user in the low-frequency will still recognize somewhat of the sound recorded on the compact disc as non-PCM encoded information.

A further preferred embodiment of a compact disc in accordance with the invention is characterized in that the non-PCM encoded information has been recorded in accordance with the proposal for Digital Theatre Sound.

A further preferred embodiment of a compact disc in accordance with the invention is characterized in that the proposal for Digital Theatre Sound defines the length of the blocks as 16 bits from b0 through b15, and the bits b14 and b15 are used for encoding the low-frequency signal.

Audio CDs produce excellent stereo sound but comprise "only" two channels. There is a demand for multi-channel surround sound. This can readily be accommodated on an audio CD with the aid of encoding techniques, but there is no standard. DTS, Digital Theatre Systems, have made a proposal for this. A crucial element of this proposal is that the relevant compact disc is not a CD ROM because it should be playable on an audio CD player. A special decoder connected to the digital output of the audio CD player translates the signal on the digital output into multi-channel surround sound. Standard systems without the special decoder, referred to herein as "normal" will have a white noise signal. On the "normal" left and right channels of a standard sound system the encoded signal sounds like white noise. In the worst case the noise is very loud, −3 dB relative to a maximum sinewave output signal. In their proposal DTS have reduced the maximum level of the encoded signal to −15 dB by not using the two most significant bits and setting them to zero. However, an embodiment of the present invention does propose the use of the two bits not to be used in the DTS proposal. Said two bits may be used, for example, to store a "bare" tone which, during playback on a "normal" sound system, produces a sound signal in the range of higher sensitivity of the ear, preferably in the range below 2 kHz.

In another embodiment these bits are filled with the most significant bits of the sound that has been recorded on the compact disc as non-PCM encoded information, i.e. the sound that becomes audible when the compact disc is played with a special decoder connected to the digital output of the audio CD player. Since only a number of most significant bits are thus rendered audible the reproduction is not of hi-fi quality but is recognizable. Care must be taken that said most significant bits relate to low-frequency information, i.e. below 2 kHz, preferably in the range around 1 kHz.

The invention can be applied to any compact disc on which digitally encoded information has been recorded and which, for any reason whatsoever, should be playable on an audio CD player, i.e. which should not be a CD ROM.

What is claimed is:

1. A compact disc playable on an audio CD player, which compact disc has been provided with non-PCM encoded information, characterized in that the non-PCM encoded information is arranged in blocks of one or more most significant bits (MSBs), and at least one MSB of each block is used for encoding a low-frequency audio signal.

2. A compact disc as claimed in claim 1, characterized in that the low-frequency audio signal lies in the frequency range below 2 kHz.

3. A compact disc as claimed in claim 2, characterized in that the low-frequency audio signal lies in the frequency range around 1 kHz.

4. A compact disc as claimed in claim 2, characterized in that the low-frequency audio signal is a single tone.

5. A compact disc as claimed in claim 4, characterized in that the single tone is a tone of approximately 1 kHz.

6. A compact disc as claimed in any one of the claims 1–5, characterized in that the at least one MSB is used for encoding sound recorded on the compact disc as non-PCM encoded information.

7. A compact disc as claimed in claim 6, characterized in that a corresponding number of MSBs of the sound have been recorded in the at least one MSB of the non-PCM encoded information.

8. A compact disc as claimed as in claim 1, characterized in that the non-PCM encoded information has been recorded in accordance with the proposal for Digital Theatre Sound.

9. A compact disc as claimed in claim 8, characterized in that the proposal for Digital Theatre Sound defines the length of the blocks as 16 bits from b0 through b15, and the bits b14 and b15 are used for encoding the low-frequency signal.

* * * * *